US 7,620,032 B2

(12) United States Patent
Sasao

(10) Patent No.: US 7,620,032 B2
(45) Date of Patent: Nov. 17, 2009

(54) MOBILE STATION, COMMUNICATION SYSTEM AND TELEPHONE COMMUNICATION SWITCHING METHOD

(75) Inventor: Nobuaki Sasao, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 448 days.

(21) Appl. No.: 11/514,087

(22) Filed: Sep. 1, 2006

(65) Prior Publication Data

US 2007/0123209 A1    May 31, 2007

(30) Foreign Application Priority Data

Sep. 2, 2005   (JP)   .............. P2005-255543

(51) Int. Cl.
- *H04L 12/66* (2006.01)
- *H04B 7/20* (2006.01)
- *H04Q 7/24* (2006.01)

(52) U.S. Cl. ............... 370/351; 370/355; 370/401; 455/450

(58) Field of Classification Search ......... 370/310–338, 370/351–355, 401–405; 455/404–419, 434–450, 455/550–553; 709/220–224
See application file for complete search history.

(56) References Cited

U.S. PATENT DOCUMENTS

| 7,366,158 | B2 * | 4/2008 | Ishidoshiro ............... 370/352 |
| 2002/0059453 | A1 | 5/2002 | Eriksson et al. | |
| 2004/0105449 | A1 * | 6/2004 | Jung et al. ............... 370/401 |
| 2004/0137907 | A1 * | 7/2004 | Kim ............... 455/450 |
| 2005/0059400 | A1 | 3/2005 | Jagadeesan et al. | |
| 2006/0010484 | A1 * | 1/2006 | Fujino ............... 726/3 |
| 2006/0120312 | A1 * | 6/2006 | Yamauchi et al. ............... 370/310 |
| 2007/0171884 | A1 * | 7/2007 | Irie et al. ............... 370/338 |

FOREIGN PATENT DOCUMENTS

| EP | 1 460 873 | 9/2004 |
| JP | 2004-235976 | 8/2004 |
| JP | 2005-192163 | 7/2005 |
| JP | 2005-252493 | 9/2005 |
| WO | WO 2004/054137 | 6/2004 |

* cited by examiner

*Primary Examiner*—M. Phan
(74) *Attorney, Agent, or Firm*—Oblon, Spivak, McClelland, Maier & Neustadt, L.L.P.

(57) ABSTRACT

A mobile station such as a cellular phone, a communication system, and a telephone communication mode switching method that enable smooth switching between telephone communication using a public telephone line and telephone communication using the Internet shortly are provided. A mobile station control part is provided that determines whether a radio communication level of telephone communication using a public telephone line is below a first reference value, acquires, if determined so, location information of the mobile station, transmits the location information to a network server, receives wireless LAN spot information transmitted from the network server according to the location information, establishes wireless LAN connection based on the wireless LAN spot information, and establishes, if the radio communication level is determined to be below a second reference value smaller than the first reference value, a call of telephone communication using the Internet with a switching unit by wireless LAN connection.

9 Claims, 6 Drawing Sheets

| | LATITUDE | LONGITUDE | ALTITUDE | INSTALLATION LOCATION | INDEX NUMBER |
|---|---|---|---|---|---|
| I10 | 35 | 135 | 2 | 2-CHOME, MINATO-KU | 1 |
| I10 | 34.2 | 125 | 58 | PARK-TOWER 35F | 2 |
| | ... | ... | ... | ... | ... |
| | I11 | I12 | I13 | I14 | I15 |

Fig.3

| INDEX NUMBER | SSID | SECURITY SYSTEM | SIP SERVER ADDRESS | PHONE NUMBER OF SWITCHING UNIT FOR VoIP | PHONE NUMBER OF SWITCHING UNIT FOR TELEPHONE LINE |
|---|---|---|---|---|---|
| 1 | 2-CHOME, MINATO-KU AP | WEP | 10.0.0.01 | 050-000-0001 | 090-000-0001 |
| 2 | SAN'O PARK-TOWER 35F AP | WPA | 10.0.0.02 | 050-000-0002 | 090-000-0002 |
| ... | ... | ... | ... | ... | ... |

MOBILE STATION, COMMUNICATION SYSTEM AND TELEPHONE COMMUNICATION SWITCHING METHOD

BACKGROUND OF THE INVENTION

1. Field of the Invention

The present invention relates to a mobile station such as a cellular phone, a communication system, and a telephone communication switching method.

2. Related Background of the Invention

Japanese Patent Application Laid-Open No. 2004-235976 discloses a mobile station such as a cellular phone that can be connected to a wireless LAN access point (hereinafter referred to as a wireless LAN spot) based on a current location. Such a mobile station can be connected to the Internet via a wireless LAN and thus telephone communication using the Internet can be performed. Telephone communication using the Internet is realized by a VoIP function. VoIP is a technology (VoIP: Voice over Internet Protocol) for a mobile station such as a cellular phone connected to a wireless LAN to transmit and receive voice data (voice call) via the Internet.

SUMMARY OF THE INVENTION

Conventionally, presence/absence of available wireless LAN spots and various kinds of data (security systems, IP addresses, and so on) required to establish a wireless LAN connection to such wireless LAN spot must be acquired by a user himself/herself to establish a wireless LAN connection based on various kinds of data acquired. Thus, if telephone communication using a public telephone line (A cellular channel is also included and this applies to the present specification) becomes difficult because the user moves out of a communication area of the public telephone line, it is difficult for the user to switch from telephone communication using a public telephone line to telephone communication using the Internet smoothly in a short time.

An object of the present invention is to provide a mobile station such as a cellular phone, a communication system, and a telephone communication switching method that enable smooth switching between telephone communication using a public telephone line and telephone communication using the Internet in a short time.

A mobile station in the present invention is a mobile station that performs telephone communication over a public telephone line or the Internet by radio via a switching unit that switches telephone communication using a public telephone line and telephone communication using the Internet, comprising a radio communication level determination means for determining, when performing telephone communication using a public telephone line, whether a radio communication level of telephone communication using the public telephone line is below a first reference value or a second reference value which is smaller than the first reference value and, when performing telephone communication using the Internet, whether the radio communication level exceeds a third reference value, a location information acquisition means for acquiring location information of the mobile station when the radio communication level determination means determines that the radio communication level is below the first reference value, a transmission means for transmitting the location information acquired by the location information acquisition means to a network server on which wireless LAN spot information associated with an installation location of a wireless LAN spot for connecting to the wireless LAN spot is stored, a reception means for receiving the wireless LAN spot information transmitted from the network server in accordance with the location information transmitted by the transmission means, a wireless LAN connection means for establishing a wireless LAN connection to a wireless LAN spot associated with the wireless LAN spot information based on the wireless LAN spot information received by the reception means, a call establishment means for establishing a call of telephone communication using the Internet with the switching unit via the wireless LAN spot with which wireless LAN connection is established by the wireless LAN connection means when the radio communication level determination means determines that the radio communication level is below the second reference value, and for establishing a call of telephone communication using a public telephone line with the switching unit when the radio communication level determination means determines that the radio communication level exceeds the third reference value, and a communication means for performing telephone communication using the Internet via the switching unit after a call of telephone communication using the Internet is established with the switching unit by the call establishment means and for performing telephone communication using a public telephone line via the switching unit after a call of telephone communication using a public telephone line is established with the switching unit by the call establishment means.

A communication system in the present invention comprising a mobile station that can perform telephone communication using a public telephone line by radio and telephone communication using the Internet via a wireless LAN spot by radio, a network server that can communicate with the mobile station and stores wireless LAN spot information associated with an installation location of a wireless LAN spot for connecting to the wireless LAN spot in a memory, and a switching unit that has a function to switch telephone communication using a public telephone line and telephone communication using the Internet and relays telephone communication from the mobile station, wherein the mobile station includes a radio communication level determination means for determining, when conducting telephone communication using a public telephone line, whether a radio communication level of telephone communication using the public telephone line is below a first reference value or a second reference value which is smaller than the first reference value and, when performing telephone communication using the Internet, whether the radio communication level exceeds a third reference value, a location information acquisition means for acquiring location information of the mobile station when the radio communication level determination means determines that the radio communication level is below the first reference value, a transmission means for transmitting the location information acquired by the location information acquisition means to the network server, a reception means for receiving the wireless LAN spot information transmitted from the network server in accordance with the location information transmitted by the transmission means, a wireless LAN connection means for establishing wireless LAN connection to a wireless LAN spot associated with the wireless LAN spot information based on the wireless LAN spot information received by the reception means, a call establishment means for establishing a call of telephone communication using the Internet with the switching unit via the wireless LAN spot to which wireless LAN connection is established by the wireless LAN connection means when the radio communication level determination means determines that the radio communication level is below the second reference value, and for establishing a call of telephone communication using a public telephone line with the switching unit when the radio communication level determination means determines that the radio communication level exceeds the third reference value, and a communication means for performing telephone communication using the Internet via the switching unit after a call of telephone communication using the Internet is established with the switching unit by the call establishment means and for performing telephone communication using a public telephone line via the switching unit after a call of telephone communication using a public telephone line is established with the switching unit by the call establishment means.

A telephone communication switching method in the present invention comprises a first radio communication level determination step for determining, when performing telephone communication using a public telephone line, whether a radio communication level of telephone communication using the public telephone line is below a first reference value, a location information acquisition step for acquiring location information of the mobile station when the radio communication level is determined to be below the first reference level, a transmission step for transmitting the acquired location information to a network server on which wireless LAN spot information associated with an installation location of a wireless LAN spot for connecting to the wireless LAN spot is stored, a reception step for receiving the wireless LAN spot information transmitted from the network server in accordance with the transmitted location information, a wireless LAN connection step for establishing wireless LAN connection to a wireless LAN spot associated with the wireless LAN spot information based on the received wireless LAN spot information, a second radio communication level determination step for determining whether the radio communication level is below a second reference value, which is smaller than the first reference value, a first call establishment step for establishing a call of telephone communication using the Internet with the switching unit via the wireless LAN spot to which wireless LAN connection is established when the radio communication level is determined to be below the second reference value, a first communication step for performing telephone communication using the Internet via the switching unit after establishing a call of telephone communication using the Internet with the switching unit, a third radio communication level determination step for determining, when performing telephone communication using the Internet, whether the radio communication level exceeds a third reference value, a second call establishment step for establishing a call of telephone communication using a public telephone line with the switching unit when the radio communication level is determined to exceed the third reference value, and a second communication step for performing telephone communication using a public telephone line via the switching unit after establishing a call of telephone communication using the public telephone line with the switching unit.

According to a mobile station, a communication system, and a telephone communication switching method in the present invention, the mobile station automatically makes wireless LAN connection settings based on wireless LAN spot information acquired from a network server. Thus, wireless LAN connection to a wireless LAN spot that has been established manually by a user can now be easily established in a short time.

Further, switching to telephone communication using the Internet is performed after establishing wireless LAN connection to a wireless LAN spot. Thus, switching from telephone communication using a public telephone line to telephone communication using the Internet is smoothly performed without interrupting a call.

Further, wireless LAN connection to a wireless LAN spot is established only when the radio communication level of telephone communication using a public telephone line is below the first reference value, and further, switching to telephone communication using the Internet is performed only when the radio communication level is below the second reference value which is smaller than the first reference value. That is, switching from telephone communication using a public telephone line to telephone communication using the Internet is performed only when the radio communication level in telephone communication using a public telephone line falls to such a level that favorable telephone communication cannot be performed. Thus, power consumption required for switching telephone communication can be suppressed.

Further, the mobile station establishes wireless LAN connection to a wireless LAN spot when performing telephone communication using a public telephone line. However, wireless LAN connection to a wireless LAN spot is established only when the radio communication level of telephone communication using a public telephone line is below the first reference value. Also, switching from telephone communication using the Internet to telephone communication using a public telephone line is performed immediately after establishing a call using a public telephone line to the switching unit. Thus, overuse of communication waves (that is, simultaneous use of radio communication related to telephone communication using a public telephone line and wireless LAN) for radio communication can be controlled.

According to the present invention, as described above, switching of telephone communication using a public telephone line and telephone communication using the Internet is smoothly and automatically performed without interrupting a call. Thus, telephone communication using a mobile station such as a cellular phone is made available in wider areas and customer convenience is improved.

Further, a mobile station of the present invention preferably further comprises a storage means for storing connection information for establishing wireless LAN connection to the wireless LAN spot by attaching an index to each of the wireless LAN spots in a memory, wherein the wireless LAN spot information is information to which the same index as that attached to the connection information is attached, and the wireless LAN connection means searches for the connection information corresponding to the wireless LAN spot information transmitted from the network server based on the index to establish wireless LAN connection based on the searched connection information.

Also, a communication system of the present system preferably further comprises a storage means for storing connection information for establishing wireless LAN connection to the wireless LAN spot by attaching an index to each of the wireless LAN spots in a memory, the wireless LAN spot information is information to which the same index as that attached to the connection information is attached, and the wireless LAN connection means searches for the connection information corresponding to the wireless LAN spot information transmitted from the network server based on the index to establish wireless LAN connection based on the searched connection information.

Also, in a telephone communication switching method of the present invention, connection information for establishing wireless LAN connection to the wireless LAN spot is preferably stored by attaching an index for each wireless LAN spot in a memory of the mobile station, the wireless LAN spot information has an attached index that is the same as that attached to the connection information for a wireless LAN spot, and in the wireless LAN connection step, the connection information corresponding to the wireless LAN spot information transmitted from the network server is searched for based on the index to establish wireless LAN connection based on the searched connection information.

Therefore, according to a mobile station, a communication system, and a telephone communication switching method in the present invention, the mobile station can search for connection information related to available wireless LAN spots easily in a short time using an index included in transmitted wireless LAN spot information as a key.

Further, in a mobile station of the present invention, the communication means preferably has a switching instruction means for transmitting a switching instruction of telephone communication to the switching unit after a call of telephone communication using the Internet or a public telephone line is established with the switching unit.

Also, in a communication system of the present invention, the communication means preferably has a switching instruction means for transmitting a switching instruction of telephone communication to the switching unit after a call of telephone communication using the Internet or a public telephone line is established with the switching unit, and the switching unit switches telephone communication based on the switching instruction after receiving the switching instruction from the mobile station.

Also, in a telephone communication switching method of the present invention, the communication means preferably has a switching instruction means for transmitting a switching instruction of telephone communication to the switching unit after a call of telephone communication using a public telephone line or the Internet is established with the switching unit.

According to the present invention, switching of telephone communication using a public telephone line and telephone communication using the Internet can be performed smoothly in a short time.

BRIEF DESCRIPTION OF THE DRAWINGS

FIG. 2 is a diagram showing content of a database in a network server.

FIG. 3 is a diagram showing content of a database in a mobile station.

DESCRIPTION OF THE PREFERRED EMBODIMENTS

Figure 1:
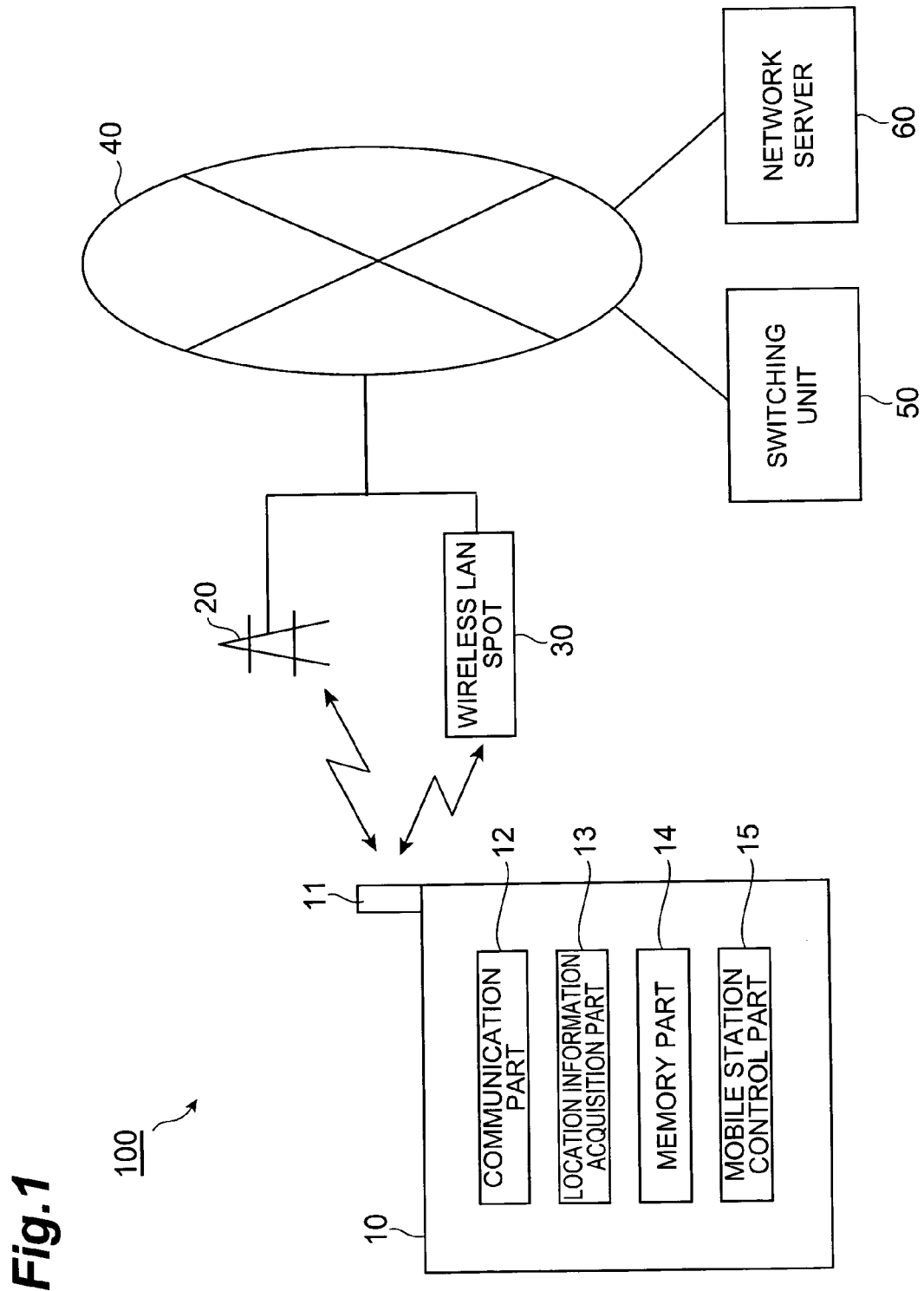
FIG. 1 is a block diagram showing a configuration of a communication system according to an embodiment.

A suitable embodiment according to the present invention will be described in detail below with reference to drawings. In drawing descriptions, the same reference numerals are attached to the same components, if possible, to omit duplicate descriptions. First, the configuration of a communication system 100 according to the embodiment will be described with reference to FIG. 1. The communication system 100 has a mobile station 10, a base station 20, a wireless LAN spot 30, a communication network 40, a switching unit 50, and a network server 60. One or more of the mobile station 10, the base station 20, the wireless LAN spot 30, the switching unit 50, and the network server 60 are contained in the communication system 100.

The mobile station 10 is, for example, a cellular phone that can perform telephone communication using a public telephone line via the base station 20 and connect to the Internet via the wireless LAN spot 30. The mobile station 10 performs communication with the base station 20 and the wireless LAN spot 30 by radio.

The base station 20 is connected to the communication network 40 including various types of communication paths such as public telephone lines and Internet lines. The wireless LAN spot 30 is connected to the communication network 40 and is an apparatus for connecting to the Internet via wireless LAN. The switching unit 50 relays telephone communication performed between the mobile station 10 and another phone (not shown) via the communication network 40. Further, the switching unit 50 switches telephone communication using a public telephone line and telephone communication using VoIP (Internet). That is, the switching unit 50 executes each of the steps C1 and C2 included in sequences shown in FIG. 5 and FIG. 6 described later.

The network server 60 has a memory (not shown) for storing a database I1 in a network server shown in FIG. 2. The network server 60 manages the database I1 in a network server (for example, responding to access requests from external equipment and performing update processing). That is, the network server 60 executes each of the steps D1 and D2 included in the sequence shown in FIG. 5 described later. Here, the database I1 in a network server will be described. The database I1 in a network server has a plurality of pieces of wireless LAN spot installation information I10 in which installation locations (latitude, longitude, and altitude) of wireless LAN spots 30 are recorded for each wireless LAN spot 30. Each piece of the wireless LAN spot installation information I10 includes latitude information I11, longitude information I12, altitude information I13, installation location information I14, and index number information I15 (wireless LAN spot information). The latitude information I11, the longitude information I12, and the altitude information I13 represent a latitude, a longitude, and an altitude of a location where each wireless LAN spot 30 is installed respectively. The installation location information I14 represents a name of a location where each wireless LAN spot 30 is installed and the index number information I15 represents an identification number to identify each wireless LAN spot 30 (wireless LAN spot installation information I10).

Next, the configuration of the mobile station 10 will be described. The mobile station 10 has an antenna 11, a communication part 12, a location information acquisition part 13, a memory part 14, and a mobile station control part 15. The communication part 12 has an interface for performing radio communication (public telephone lines and the Internet) with the base station 20 and the wireless LAN spot 30 via the antenna 11. The location information acquisition part 13 is a positioning device using, for example, a GPS (Global Positioning System). The memory part 14 is, for example, a flash memory and stores various kinds of data such as a database I2 in a mobile station shown in FIG. 3 as read/write enabled data. The database I2 in a mobile station is managed (for example, data readout and update) by the mobile station control part 15.

Here, the database I2 in the mobile station will be described. The database I2 in the mobile station has a plurality of pieces of wireless LAN spot connection information I20 (connection information) in which connection information to wireless LAN spots 30 is recorded for each wireless LAN spot 30.

Each piece of wireless LAN spot connection information I20 includes index number information I21, SSID (Service Set ID) information I22, security system information I23, SIP (Session Initiation Protocol) server address information I24, phone number information I25, and phone number information I26. The index number information I21 represents an identification number to identify each wireless LAN spot 30 (wireless LAN spot connection information I20) and the SSID information I22 represents a network name (network ID) to which each wireless LAN spot 30 belongs. The security system information I23 represents a security system for communication (such as WEP and WPA) used by each wireless LAN spot 30 and the SIP server address information I24 represents an IP address of an SIP server for connecting to the Internet from each wireless LAN spot 30. The phone number information I25 represents a phone number of the switching unit 50 used when performing telephone communication using VoIP via each wireless LAN spot 30 and the phone number information I26 represents a phone number of the switching unit 50 used when performing telephone communication using a cellular phone via each base station 20.

The mobile station control part 15 (radio reception level determination means, location information acquisition means, transmission means, reception means, wireless LAN connection means, call establishment means, communication means, and switching instruction means) has CPU, ROM, and RAM, which are not shown, and the mobile station 10 is totally controlled by causing the CPU to execute various programs stored in the ROM. The mobile station control part 15 also executes each of steps B1 to B8 and B10 to B13 included in sequences shown in FIG. 5 and FIG. 6 by controlling the communication part 12, the location information acquisition part 13, and the memory part 14. The mobile station control part 15 determines whether radio intensity (radio communication level) of communication wave is greater or smaller than the first, second, and third reference values. Here, the first reference value is greater than the second reference value and the third reference value is approximately the same as the first reference value.

The first reference value is a reference value used by the mobile station control part 15 to determine whether to perform preparation processing (called switching preparation processing to telephone communication using VoIP) for switching from telephone communication using a public telephone line to telephone communication using VoIP. Here, preparation processing to switch to telephone communication using VoIP means a succession of processing (steps B1 to B4, D1, and D2 included in the sequence of FIG. 5) for establishing wireless LAN connection to the wireless LAN spot 30 while performing telephone communication using a public telephone line. The mobile station control part 15 performs, when determining that radio intensity of communication wave is below the first reference value, preparation processing to switch to telephone communication using VoIP.

The second reference value is one used by the mobile station control part 15 to determine, after performing preparation processing to switch to telephone communication using VoIP, whether to perform switching processing (called switching processing to telephone communication using VoIP) to the telephone communication. Here, processing to switch to telephone communication using VoIP means a succession of processing (steps B5 to B8, and C1 included in the sequence of FIG. 5) for switching from telephone communication using a public telephone line to telephone communication using VoIP. The mobile station control part 15 performs, when determining that radio intensity of communication wave is below the second reference value, processing to switch to telephone communication using VoIP.

The third reference value is one used by the mobile station control part 15 to determine whether to perform processing (called switching processing to telephone communication using a public telephone line) for switching from telephone communication using VoIP to telephone communication using a public telephone line. Here, processing to switch to telephone communication using a public telephone line means a succession of processing (steps B10 to B13, and C2 shown in FIG. 6) for switching from telephone communication using VoIP to telephone communication using a public telephone line. The mobile station control part 15 performs, when determining that radio intensity of communication wave exceeds the third reference value, processing to switch to telephone communication using a public telephone line.

Figure 4:
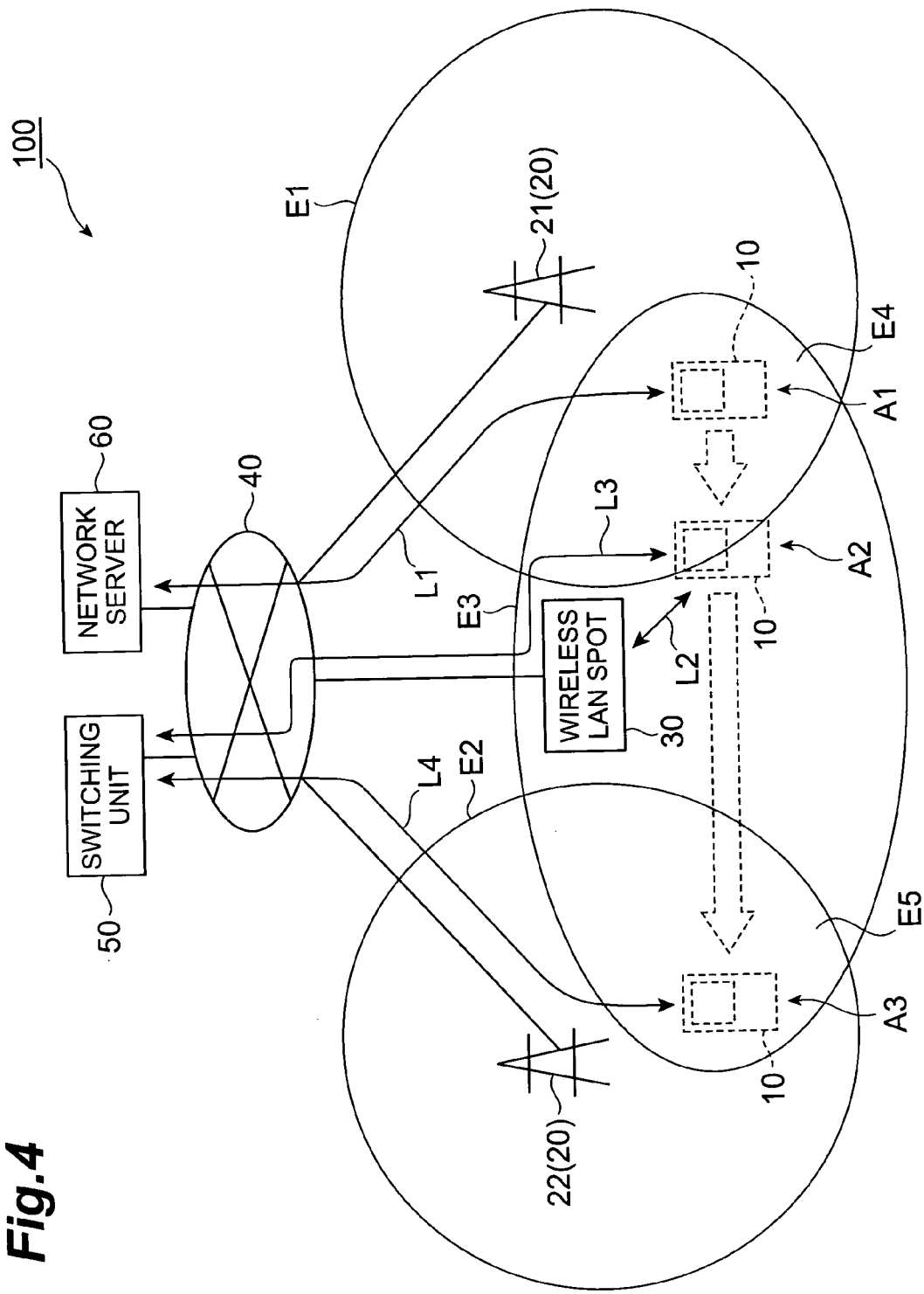
FIG. 4 shows a diagram for illustrating an operation of the communication system according to the embodiment.
Figure 5:
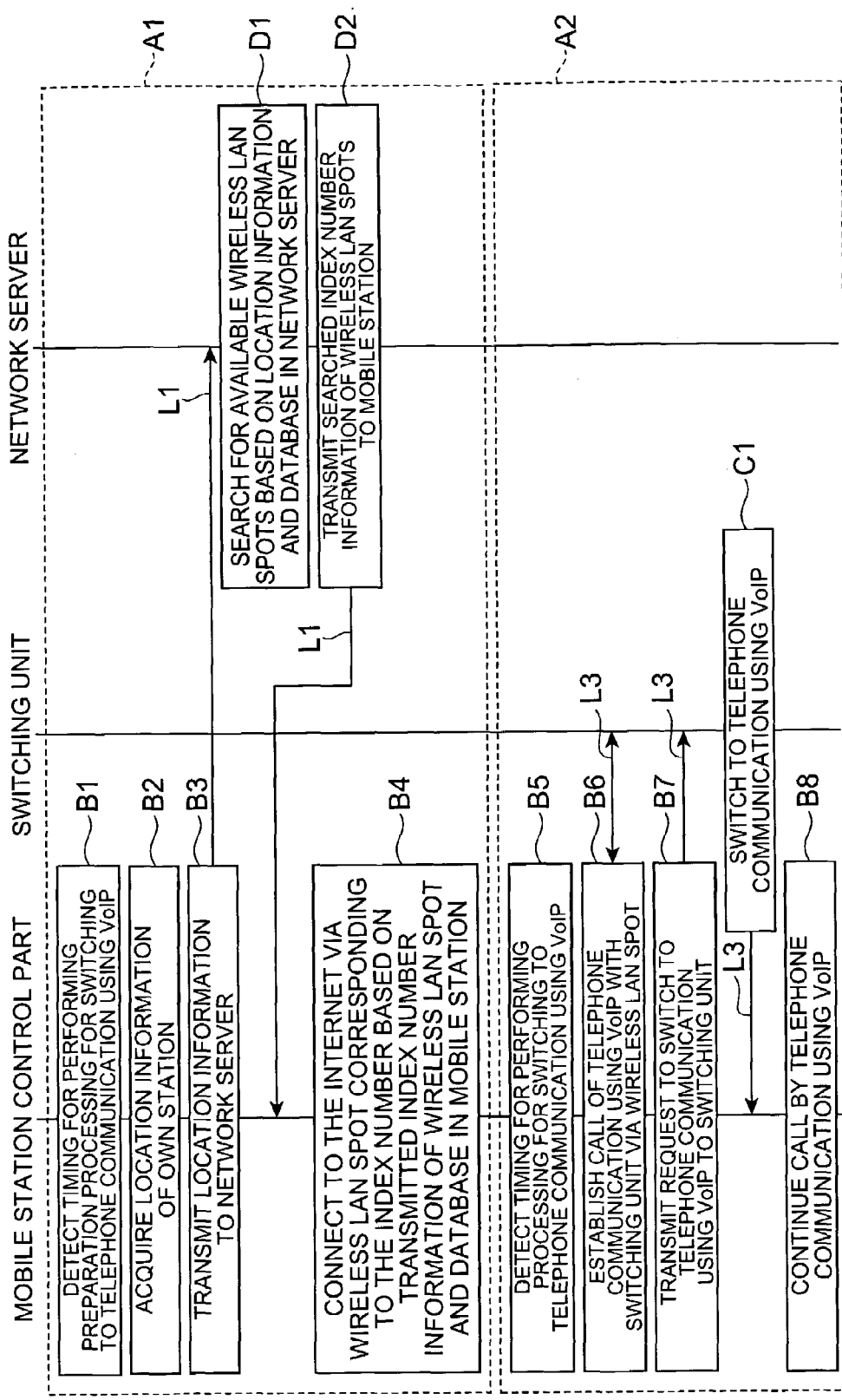
FIG. 5 shows a sequence for illustrating an operation of the communication system according to the embodiment.
Figure 6:
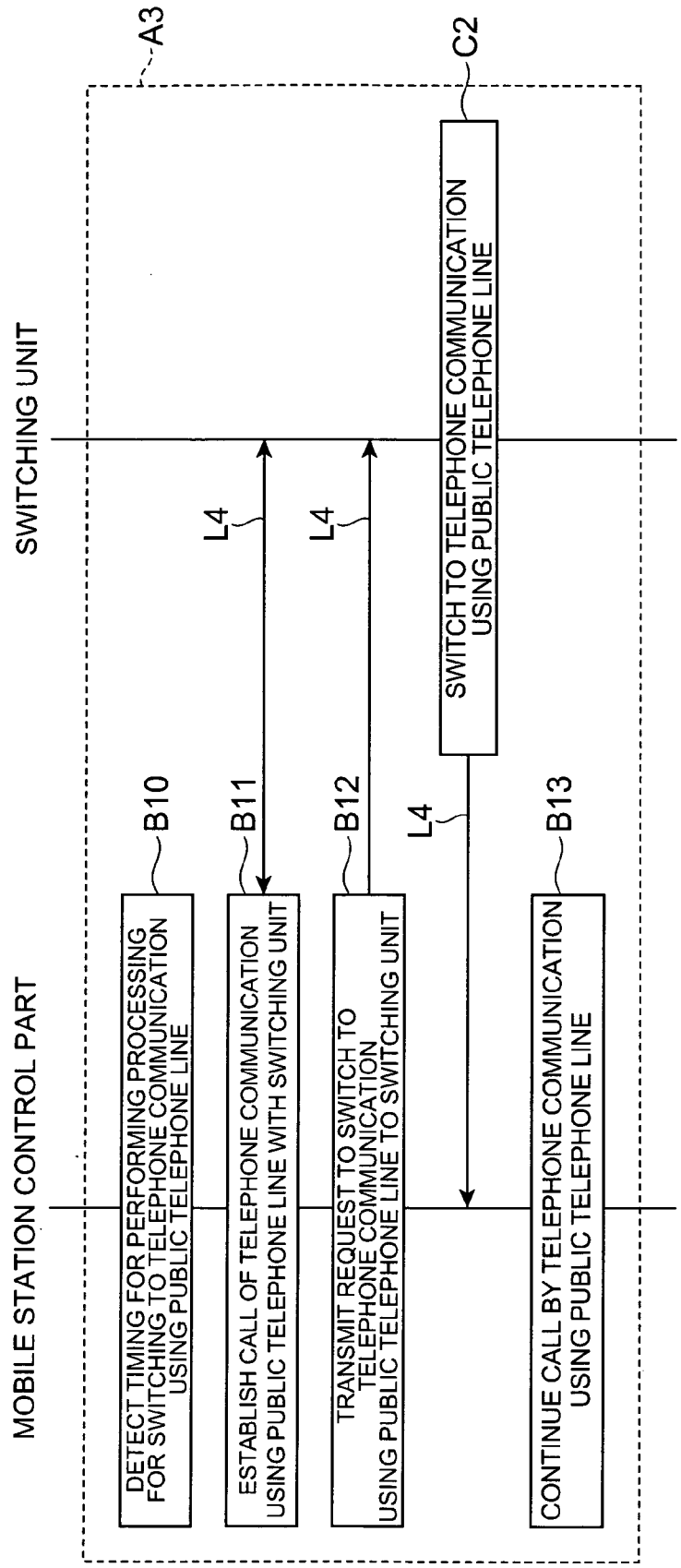
FIG. 6 shows a sequence for illustrating an operation of the communication system according to the embodiment.

Next, an operation of the communication system 100 according to the embodiment will be described with reference to FIGS. 4 to 6. An operation of the communication system 100 when switching a communication mode of telephone communication of the mobile station 10 will be described below. Note that the communication system 100 illustrated in FIG. 4 has two base stations 20 and each will be denoted as a base station 21 and a base station 22. The number of base stations 20 shown in FIG. 4 is only an example and is not limited to this. Also, the communication system 100 illustrated in FIG. 4 has one wireless LAN spot 30, but the number of wireless LAN spots 30 is not limited to this. The base station 21 forms a communication area E1 that can communicate with the mobile station 10 and the base station 22 forms a communication area E2 that can communicate with the mobile station 10. The wireless LAN spot 30 forms a communication area E3 that can communicate with the mobile station 10. The communication areas E1 and E3 have an overlapping part area (called a communication area E4). The communication area E4 is an area in which the mobile station 10 can communicate with both the base station 21 and the wireless LAN spot 30. Also, the communication areas E2 and E3 have an overlapping part area (called a communication area E5). The communication area E5 is an area in which the mobile station 10 can communicate with both the base station 22 and the wireless LAN spot 30.

FIG. 4 shows a case in which the mobile station 10 moves from the communication area E1 to the communication area E4 (step A1), then to an area adjacent to a boundary of the communication area E1 in the communication area E3 (step A2), and to the communication area E5 (step A3). In step A1, the mobile station 10 performs preparation processing to switch to telephone communication using VoIP by communicating with the network server 60 via a communication path L1 including the base station 21 and the communication network 40. In step A2, the mobile station 10 performs processing to switch to telephone communication using VoIP by establishing wireless LAN connection to the wireless LAN spot 30 via a communication path L2 and, after establishing the wireless LAN connection, performing communication with the switching unit 50 via a communication path L3 including the communication path L2. In step A3, the mobile station 10 performs processing to switch to telephone communication using a cellular phone by performing communication with the switching unit 50 via a communication path L4 including the base station 22 and the communication network 40.

Next, details of processing performed by the communication system 100 in each of step A1, step A2, and step A3 will be described with reference to FIGS. 5 and 6. First, content of processing performed by the communication system 100 in step A1 will be described. The mobile station control part 15 of the mobile station 10 in the communication area E4 determines that radio intensity of communication wave is below the first reference value and, upon detection of timing for performing preparation processing to switch to telephone communication using VoIP (step B1), uses the location information acquisition part 13 to acquire location information (information indicating the latitude, longitude, and altitude) of the mobile station 10 (step B2). The mobile station control part 15 uses the communication part 12 to transmit its own location information acquired in step B2 to the network server 60 via the communication path L1 (step B3).

After step B3 is performed, the network server 60 searches for the wireless LAN spot 30 available for the mobile station 10 based on the location information transmitted from the mobile station 10 and the database I1 in the network server (step D1). In the step D1, by comparing the latitude, longitude, and altitude contained in the location information with the latitude information I11, longitude information I12, and altitude information I13 in the database I1 in the network server, the network server 60 searches the database I1 in the network server for the wireless LAN spot installation information I10 associated with the wireless LAN spot 30 installed at any location within a range prescribed by the latitude, longitude, and altitude contained in the location information (preset range in which wireless LAN connection can be established). After step D1 is performed, the network server 60 transmits the index number information I15 of the searched wireless LAN spot installation information I10 (or the whole wireless LAN spot installation information I10) to the mobile station 10 via the communication path L1 (step D2).

After step D2 is performed, the mobile station control part 15 establishes wireless LAN connection, based on the index number information I15 transmitted by the network server 60 and the database I2 in the mobile station, to the wireless LAN spot 30 corresponding to the index number via the communication path L2 to connect to the Internet (step B4). In step B4, the mobile station control part 15 searches the database I2 in the mobile station to acquire the wireless LAN spot connection information I20 corresponding to the index number of the index number information I15 transmitted by the network server 60. Then, the mobile station control part 15 establishes wireless LAN connection, based on the security system information I23 and the SIP server address information I24 contained in the acquired wireless LAN spot connection information I20, to the wireless LAN spot 30 corresponding to the index number related to the wireless LAN spot connection information I20. The mobile station 10 is connected to the Internet by the wireless LAN connection.

Next, content of processing performed by the communication system 100 in step A2 will be described. After step A1 is performed, the mobile station control part 15 determines, after reaching an area adjacent to the boundary of the communication area E1 in the communication area E3, that radio intensity of communication wave is below the second reference value and detects timing for performing processing to switch to telephone communication using VoIP (step B5). After the timing is detected, the mobile station control part 15 establishes a call of telephone communication using VoIP with the switching unit 50 via the communication path L3 including the wireless LAN spot 30 to which wireless LAN connection was established in step B4 (step B6). In step B6, the mobile station control part 15 acquires the phone number information I25 (phone number for VoIP) of the switching unit 50 contained in the wireless LAN spot connection information I20 acquired in step B4 from the database I2 in the mobile station to establish a call for the phone number.

After step B6 is performed, the mobile station control part 15 transmits a request to switch to telephone communication using VoIP to the switching unit 50 via the communication path L3 (step B7). After step B7 is performed, the switching unit 50 switches telephone communication of the mobile station 10 from telephone communication using a public telephone line to telephone communication using VoIP (step C1). Then, the switching unit 50 transmits a notification of this switching to the mobile station 10 via the communication path L3. After step C1 is performed, the mobile station control part 15 continues a call by telephone communication using VoIP (step B8).

Next, content of processing performed by the communication system 100 in step A3 will be described. After step A2 is performed, the mobile station control part 15 determines, after reaching the communication area E5 in which communication with the base station 22 can be performed, that radio intensity of communication wave exceeds the third reference value and detects timing for performing processing to switch to telephone communication using a public telephone line (step B10). After step A10 is performed, the mobile station control part 15 establishes a call of telephone communication using a public telephone line with the switching unit 50 via the communication path L4 including the base station 22 and the communication network 40 (step B11). In step B11, the mobile station control part 15 acquires the phone number information I26 (phone number for a public telephone line) of the switching unit 50 contained in the wireless LAN spot connection information I20 acquired in step B4 to establish a call for the phone number (call to the switching unit 50).

After step B11, that is, establishing a call to the switching unit 50, the mobile station control part 15 immediately transmits a request to switch to telephone communication using a public telephone line to the switching unit 50 via the communication path L4 (step B12). After step B12 is performed, the switching unit 50 switches telephone communication of the mobile station 10 from telephone communication using VoIP to telephone communication using a public telephone line (step C2). Then, the switching unit 50 transmits a notification of this switching to the mobile station 10 via the communication path L4.

After step C2, the mobile station control part 15 continues a call by telephone communication using a public telephone line (step B13). With steps A1, A2, and A3 described above, switching from telephone communication using a public telephone line to telephone communication using VoIP and switching from telephone communication using VoIP to telephone communication using a public telephone line can both be performed smoothly.

However, the present invention is not limited to the above embodiment. For example, the wireless LAN spot installation information I10 in the database I1 in a network server may contain information similar to the SIP server address information I24, the phone number information I25, and the phone number information I26 contained in the wireless LAN spot connection information I20. In this case, the mobile station 10 establishes wireless LAN connection based on SIP server address information I24, phone number information I25 and phone number information I26 contained in the wireless LAN spot connection information I20 transmitted from the network server 60 (step B4), establishes a call of telephone communication using VoIP with the switching unit 50 (step B6), and establishes a call of telephone communication using a public telephone line with the switching unit 50 (step B11).

Next, effects produced by the above-described mobile station 10 and the communication system 100 will be described. The wireless LAN spot 30 identified by the index number information I15 in the database I1 in a network server managed by the network server 60 and a wireless LAN spot identified by the index number information I21 in the database I2 in a mobile station managed by the mobile station 10 are the same. Thus, the mobile station 10 can easily search for the wireless LAN spot connection information I20 associated with available wireless LAN spots in a short time using the index number information I15 contained in the transmitted wireless LAN spot installation information I10 as a key.

Further, the mobile station 10 automatically acquires presence/absence of available wireless LAN spots and various kinds of data (security systems, IP addresses, and so on) required to establish wireless LAN connection to such wireless LAN spots and automatically makes settings for wireless LAN connection based on the acquired various kinds of data. Thus, wireless LAN connection to a wireless LAN spot that has been performed manually by a user can now be performed easily by the communication system 100 in a short time.

Further, processing to switch to telephone communication using VoIP is performed after performing preparation processing to switch to telephone communication using VoIP. Thus, switching from telephone communication using a public telephone line to telephone communication using VoIP can be performed smoothly without interrupting a call. Preparation processing to switch to telephone communication using VoIP is performed only when radio intensity of communication wave is below the first reference value and, further, processing to switch to telephone communication using VoIP is performed only when radio intensity of communication wave is below the second reference value which is smaller than the first reference value. That is, switching from telephone communication using a public telephone line to telephone communication using VoIP is performed only when radio intensity of communication wave in telephone communication using a public telephone line falls to such a level that good telephone communication cannot be performed. Thus, power consumption required for switching telephone communication can be suppressed.

Further, in preparation processing to switch to telephone communication using VoIP, the mobile station 10 communicates with the base station 20 and the wireless LAN spot 30. However, the preparation processing to switch to telephone communication using VoIP is performed only when radio intensity of communication wave is below the first reference value. Also, switching from telephone communication using VoIP to telephone communication using a public telephone line is performed immediately after establishing a call using a public telephone line to the switching unit 50. Thus, overuse of communication waves (that is, simultaneous use of radio communication with the base station 20 and wireless LAN with the wireless LAN spot 30) can be controlled.

From what has been described above, telephone communication using VoIP and telephone communication using a public telephone line can be switched smoothly and automatically in the communication system 100 without interrupting a call. Thus, telephone communication using the mobile station 10 such as a cellular phone is made available in wider areas and customer convenience is improved.

What is claimed is:

1. A mobile station that performs telephone communication over a public telephone line or the Internet by radio via a switching unit that switches the telephone communication using the public telephone line and the telephone communication using the Internet, comprising:
   a radio communication level determination means for determining, when performing telephone communication using the public telephone line, whether a radio communication level of the telephone communication using the public telephone line is below a first reference value or a second reference value which is smaller than the first reference value and, when performing the telephone communication using the Internet, whether the radio communication level exceeds a third reference value;
   a location information acquisition means for acquiring location information of the mobile station when the radio communication level determination means determines that the radio communication level is below the first reference value;
   a transmission means for transmitting the location information acquired by the location information acquisition means to a network server on which wireless LAN spot information associated with an installation location of a wireless LAN spot for connecting to the wireless LAN spot is stored;
   a reception means for receiving the wireless LAN spot information transmitted from the network server in accordance with the location information transmitted by the transmission means;
   a wireless LAN connection means for establishing wireless LAN connection to a wireless LAN spot associated with the wireless LAN spot information based on the wireless LAN spot information received by the reception means;
   a call establishment means for establishing a call of telephone communication using the Internet with the switching unit via the wireless LAN spot to which the wireless LAN connection is established by the wireless LAN connection means when the radio communication level determination means determines that the radio communication level is below the second reference value, and for establishing a call of telephone communication using a public telephone line with the switching unit when the radio communication level determination means determines that the radio communication level exceeds the third reference value; and
   a communication means for performing telephone communication using the Internet via the switching unit after a call of telephone communication using the Internet is established with the switching unit by the call establishment means and for performing telephone communication using a public telephone line via the switching unit after a call of telephone communication using a public telephone line is established with the switching unit by the call establishment means.

2. The mobile station according to claim 1; further comprising:
   a storage means for storing connection information for establishing wireless LAN connection to the wireless LAN spot by attaching an index to each of the wireless LAN spots in a memory, wherein
   the wireless LAN spot information is information to which the same index as that attached to the connection information is attached, and
   the wireless LAN connection means searches for the connection information corresponding to the wireless LAN spot information transmitted from the network server based on the index to establish wireless LAN connection based on the searched connection information.

3. The mobile station according to claim 1, wherein the communication means includes a switching instruction means for transmitting a switching instruction of telephone communication to the switching unit after a call of telephone communication using the Internet or a public telephone line is established with the switching unit.

4. A communication system comprising a mobile station that can perform telephone communication using a public telephone line by radio and telephone communication using the Internet via a wireless LAN spot by radio,
- a network server that can communicate with the mobile station and stores wireless LAN spot information associated with an installation location of a wireless LAN spot for connecting to the wireless LAN spot in a memory, and
- a switching unit that has a function to switch telephone communication using a public telephone line and telephone communication using the Internet and relays telephone communication from the mobile station, wherein the mobile station includes:
- a radio communication level determination means for determining, when performing telephone communication using a public telephone line, whether a radio communication level of telephone communication using the public telephone line is below a first reference value or a second reference value which is smaller than the first reference value and, when performing telephone communication using the Internet, whether the radio communication level exceeds a third reference value;
- a location information acquisition means for acquiring location information of the mobile station when the radio communication level determination means determines that the radio communication level is below the first reference value;
- a transmission means for transmitting the location information acquired by the location information acquisition means to the network server;
- a reception means for receiving the wireless LAN spot information transmitted from the network server in accordance with the location information transmitted by the transmission means;
- a wireless LAN connection means for establishing wireless LAN connection to a wireless LAN spot associated with the wireless LAN spot information based on the wireless LAN spot information received by the reception means;
- a call establishment means for establishing a call of telephone communication using the Internet with the switching unit via the wireless LAN spot to which wireless LAN connection is established by the wireless LAN connection means when the radio communication level determination means determines that the radio communication level is below the second reference value, and for establishing a call of telephone communication using a public telephone line with the switching unit when the radio communication level determination means determines that the radio communication level exceeds the third reference value; and
- a communication means for performing telephone communication using the Internet via the switching unit after a call of telephone communication using the Internet is established with the switching unit by the call establishment means and for performing telephone communication using a public telephone line via the switching unit after a call of telephone communication using a public telephone line is established with the switching unit by the call establishment means.

5. The communication system according to claim 4; further comprising:
- a storage means for storing connection information for establishing wireless LAN connection to the wireless LAN spot by attaching an index to each of the wireless LAN spots in a memory, wherein
- the wireless LAN spot information is information representing a wireless LAN spot to which the same index as that attached to the connection information is attached, and
- the wireless LAN connection means searches for the connection information corresponding to the wireless LAN spot information transmitted from the network server based on the index to establish wireless LAN connection based on the searched connection information.

6. The communication system according to claim 4, wherein the communication means includes a switching instruction means for transmitting a switching instruction of telephone communication to the switching unit after a call of telephone communication using the Internet or a public telephone line is established with the switching unit, and
- the switching unit switches telephone communication based on the switching instruction after receiving the switching instruction from the mobile station.

7. A telephone communication switching method; comprising:
- a first radio communication level determination step for determining, when performing telephone communication using a public telephone line, whether a radio communication level of telephone communication using the public telephone line is below a first reference value,
- a location information acquisition step for acquiring location information of the mobile station when the radio communication level is determined to be below the first reference level,
- a transmission step for transmitting the acquired location information to a network server on which wireless LAN spot information associated with an installation location of a wireless LAN spot for connecting to the wireless LAN spot is stored,
- a reception step for receiving the wireless LAN spot information transmitted from the network server in accordance with the transmitted location information,
- a wireless LAN connection step for establishing wireless LAN connection to a wireless LAN spot associated with the wireless LAN spot information based on the received wireless LAN spot information,
- a second radio communication level determination step for determining whether the radio communication level is below a second reference value which is smaller than the first reference value,
- a first call establishment step for establishing a call of telephone communication using the Internet with a switching unit via a wireless LAN spot to which wireless LAN connection is established when the radio communication level is determined to be below the second reference value,
- a first communication step for performing telephone communication using the Internet via the switching unit after establishing a call of telephone communication using the Internet with the switching unit,
- a third radio communication level determination step for determining, when performing telephone communication using the Internet, whether the radio communication level exceeds a third reference value,
- a second call establishment step for establishing a call of telephone communication using a public telephone line with the switching unit when the radio communication level is determined to exceed the third reference value, and
- a second communication step for conducting telephone communication using a public telephone line via the switching unit after establishing a call of telephone communication using the public telephone line with the switching unit.

8. The telephone communication switching method according to claim 7, wherein connection information for establishing wireless LAN connection to the wireless LAN spot is stored in a memory of the mobile station by attaching an index for each wireless LAN spot, the same index as that attached to the connection information for the wireless LAN spot is attached to the wireless LAN spot information, and in the wireless LAN connection step, the connection information corresponding to the wireless LAN spot information transmitted from the network server is searched for based on the index to establish wireless LAN connection based on the searched connection information.

9. The telephone communication switching method according to claim 7, wherein the communication means includes a switching instruction means for transmitting a switching instruction of telephone communication to the switching unit after a call of telephone communication using the Internet or a public telephone line is established with the switching unit.

* * * * *